3,350,362
OXIDIZED OLEFIN POLYMERS MODIFIED WITH ORGANIC POLYISOCYANATES
James E. Potts, Millington, and Chester L. Purcell, Somerville, N.J., assignors to Union Carbide Corporation, a corporation of New York
No Drawing. Filed Mar. 27, 1962, Ser. No. 182,941
6 Claims. (Cl. 260—77.5)

This application is a continuation-in-part of co-pending application, Serial No. 104,811, filed April 24, 1961 and now abandoned.

This invention relates to modified olefin polymers exhibiting improved clarity, stress cracking resistance and adhesion to a wide variety of substrates. More particularly, the invention relates to a method for modifying olefin polymers to exhibit one or more of the above characteristics and to olefin polymers so modified.

The term "olefin polymers" is used in the present specification and claims to denote normally solid homopolymers of alpha mono-olefinically unsaturated hydrocarbons as well as normally solid copolymers thereof, with one or more other organic compounds copolymerizable therewith which contain polymer producing unsaturation, such as is present for example in carbon monoxide and formaldehyde and in compounds containing the ethylene linkage, $>C=C<$, e.g., styrene, vinyl stearate, butene, vinyl acetate, vinyl formate, methyl acrylate, monobutyl maleate, 2-ethyl hexyl acrylate, N-methyl-N-vinyl acetamide, acrylic acid, ethyl acrylate, methacrylic acid, isoprene, butadiene, acrylamide, vinyl triethoxysilane, bicycloheptene, bicycloheptadiene, divinyl phosphonate and the like. Many other copolymerizable monomers which can be used in addition to these illustrative compounds are well known to the art. Preferred olefin polymers in this invention contain at least 10 percent by weight of a combined alpha mono-olefinically unsaturated hydrocarbon having from 2 to 4 carbon atoms inclusive, i.e. butene-1, propylene and especially ethylene.

Olefin polymers are desirably modified for various end uses, for example, to provide increased molecular weight, higher thermal deformation temperatures, improved clarity and enhanced solvent resistance. Heretofore, such modification has been carried out by crosslinking the olefin polymer as by irradiation, or by treatment with peroxides. Peroxide crosslinking accomplishes the desired improvements in olefin polymers but has undesirable side effects such as the leaving of residues which may adversely affect stability, electrical and permeability properties.

As packaging materials, olefin polymer films are characteristically superior to cellulosic and metallic materials in flexibility, resistance to tear and in being unaffected by moisture and chemically active environments. Cellulosic and metallic packaging materials, however, are generally superior to olefin polymer films in shock-absorbing properties and are more easily handled in automatic packaging machinery. A combination of the properties of these packaging materials is possible by laminating or coating the olefin polymer on the cellulosic or metallic material. The general inertness of the olefin polymers to solvents and adhesives, however, has thus far substantially prevented obtaining of suitable laminated and coated substrates except by costly pretreatment of the olefin polymer surface, e.g. etching with chromic acid, subjecting to corona discharge and flame treatment.

It is an object, therefore, of the present invention to provide olefin polymers exhibiting increased molecular weight, higher thermal deformation temperatures, improved clarity and enhanced solvent resistance and which are not reduced in stability or permeability.

It is another object to provide olefin polymers which exhibit good adhesion to both porous and nonporous substrates without the need of surface treatment of the polymer after shaping which are adapted to use in coating and in laminate constructions.

It is another object to provide a method for modifying olefin polymers to impart increased molecular weight, higher thermal deformation temperature characteristics, improved clarity and enhanced solvent resistance.

It is another object to provide a method for modifying olefin polymers to impart improved adhesional characteristics.

It has now been discovered that, improved adhesional characteristics, increased molecular weight, higher thermal deformation temperature characteristics, improved clarity and enhanced solvent resistance are imparted to olefin polymers having a peroxide content (measured as described below) of from 0.15 to 3.5 milligrams (mg.) peroxide per gram resin and/or an infra-red carbonyl content (also measured as described below) of from 0.0005 to 0.03 carbonyl absorbance per mil resin by reacting the olefin polymer with a polyisocyanate, an organic compound containing at least two $—N=C=O$ groups.

It has further been discovered that the foregoing improvements are imparted to carboxyl containing olefin polymers by reacting the olefin polymer with a polyisocyanate, preferably a normally solid polyisocyanate.

It is to be pointed out that use of a polyisocyanate with virgin olefin hydrocarbon polymers does not improve the above physical properties, e.g. solvent resistance.

Important and advantageous modifications of olefin polymers can be achieved by the use of non-free-radical crosslinking agents, namely polyisocyanates, which have heretofore been achieved only by the use of free radical type crosslinking agents e.g., peroxides. Moreover, the use of polyisocyanates as crosslinking agents poses none of the problems associated with peroxide crosslinking agent used alone.

A highly surprising and unexpected property of the polyisocyanate reacted oxidized olefin polymers of this invention is their marked adhesional properties. These olefin polymers applied as liquids for coating or as film for surfacing various substrates or as laminate interlayers exhibit tenacious adhesion to fibrous, nonfibrous, porous and nonporous, flexible and rigid, metallic and nonmetallic, polymeric, cellulosic and glass surfaces.

In order to modify olefinic hydrocarbon polymers in adhesional characteristics, molecular weight, thermal deformation temperature characteristics, improved clarity and enhanced solvent resistance, it is essential in the method of this invention to mix to substantial homogenity such an olefin polymer with the above peroxide and carbonyl characteristics and the polyisocyanate and crosslink the olefin polymer by reacting the isocyanate groups on the crosslinking agent with the olefin polymer.

These peroxide and carbonyl values cannot be obtained without deliberate oxidation.

The particular means of achieving oxidation of the olefin polymer is not narrowly critical. Broadly, intimately contacting the olefin polymer with an oxygen contacting environment such as air, oxygen, ozone, various catalytic agents, or chemical reagents for a sufficient length of time will result in the oxidation production of certain isocyanate reactive groups. Among these groups are carboxyl, hydroxyl, hydroperoxide and hydrogen groups. Levels of peroxide and/or carbonyl within the above limits are indicative of the presence of suitable amounts of these oxidation produced groups.

A suitable means of producing these groups in olefin polymers is to bubble ozone, or oxygen or a mixture thereof, e.g. 2% ozone in oxygen, through a heated bed e.g. to 60° C. of powdered e.g. 20 mesh, virgin olefin polymer for a sufficient time e.g. for 60 minutes.

This treatment of a virgin ethylene homopolymer which normally has a carbonyl absorbance per mil of 0.0002 and a peroxide content of 0.04 milligram per gram resin results in an oxidized ethylene polymer increased in carbonyl absorbance to 0.003 per mil resin and peroxide content to 1.4 milligrams per gram resin. Also suitable is treating the virgin olefin polymer with an oxidizing chemical reagent e.g., by slurrying powdered resin in heated chromic acid (sulfuric acid-potassium dichromate) for about 30 minutes. The resin should be washed with water afterwards to remove acid and dichromate. This treatment of virgin ethylene homopolymer causes an increase in carbonyl absorbance per mil to 0.005 and in peroxide content to 1.5 milligrams per gram resin.

Still another suitable method of controllably oxidizing ethylene polymers is milling the polymer in air or oxygen containing atmosphere at elevated temperatures e.g., above 110° C. for a sufficient period e.g. 45 minutes. This treatment of ethylene homopolymer causes an increase in carbonyl absorbance to 0.007 per mil and in peroxide content to 1.9 milligrams peroxide per gram resin. Other oxidizing means include agitation in suitably atmospherically controlled apparatus other than roll mills. Oxidation can also be effected by sparging oxygen, air or ozone into a solution of the ethylene polymer.

From the foregoing illustrative means for oxidizing the olefin polymers, it can be seen that in any method wherein heat and oxygen are mutually present with an olefin polymer under conditions insuring a good degree of contact between the polymer and the oxygen, oxidation will take place. It is of course also required that the contacting be carried out for a time sufficient to build up carbonyl absorbance and peroxide content levels to the above set forth minimal values.

By the term "virgin olefin polymers" is meant those olefin polymers which have not been subjected to deliberate oxidation by mechanical working, solvating or chemical reaction in an oxidizing atmosphere. The oxidation levels needed in the olefin polymers for molecular weight, solvent resistance, clarity and thermal deformation improvement are not present in virgin olefin polymers. In the absence of deliberate oxidation levels of olefin polymers are substantially as shown in Table I in which all percentages are by weight and in which the carbonyl absorbance and peroxide content were determined as hereinafter set forth.

Carboxyl (—COOH) containing polymers, by virtue of having these groups, do not require oxidation to the above prescribed levels of peroxide content and/or carboxyl absorbance in contradistinction to polymers and copolymers of noncarboxylated olefins.

Polymers and copolymers of monomers containing mixed functional groups e.g. hydroxyl containing carboxylated olefin monomers and carboxyl containing hydroxylated olefin monomers can also be reacted with polyisocyanates to impart the herein described properties.

TABLE I

| Olefin Polymer | Carbonyl Absorbance per mil [1] | Peroxide Content, mg./gm. resin |
|---|---|---|
| Ethylene homopolymer: | | |
| (0.92 density) | 0.0002 | 0.04 |
| (0.945 density) | 0.0002 | 0.02 |
| Ethylene/carbon monoxide (94%/6%) | | 0.06 |
| Ethylene/propylene (48%/52%) | | 0.035 |
| Ethylene/propylene (89%/11%) | | 0.045 |
| Ethylene/ethyl acrylate (79%/21%) | | 0.024 |
| Ethylene/ethyl acrylate (94%/6%) | | 0.05 |
| Ethylene/vinyl acetate (5.6 mole percent vinyl acetate in feed) | | 0.05 |
| Propylene | 0.0002 | 0.04 |

[1] Because olefin polymers may contain bands in the infra red which interfere with the carbonyl band, 5.8–5.85, meaningful infra red data must be in comparison with another sample of the resin, e.g., oxidized vs. virgin (differential carbonyl absorbance). Hence carbonyl values in this table are given only for ethylene homopolymers which are devoid of carbonyl or other interfering bands and hence give absolute carbonyl absorbance values.

Preferred means for oxidizing the olefin polymers are mechanical mixing apparatus open to the air such as two-roll mills and closed intermeshing gear type apparatus provided with oxygen or air atmosphere. These apparatus especially when heated to between 110° C. to 170° C., depending upon the oxidation susceptibility of the polymer easily bring olefin polymers above (1) the minimum peroxide content of 0.15 milligram peroxide per gram resin and into the preferred peroxide content range of from 0.60 to 2.7 milligrams peroxide per gram resin; and (2) above the minimum differential carbonyl absorbance of 0.0005 per mil resin to within preferred range of 0.001 and above carbonyl absorbance per mil resin. Differential carbonyl absorbance per mil in the case of ethylene homopolymer is equal to the absolute carbonyl absorbance due to the absence of interferring bands in that polymer; with certain ethylene copolymers, however, the differential carbonyl absorbance represents only the relative amounts of carbonyl before and after the oxidation described above.

An advantage of mechanical mixing apparatus is that the polyisocyanate reactant can be blended in with the olefin polymer or just subsequently thereto without the need of further handling of the oxidizing polymer. For example, an ethylene polymer can be oxidized by milling 45 minutes at 170° C. in air and the polyisocyanate blended in by fluxing the polymer at 110° C., adding the polyisocyanate and milling for about 5 minutes or until the additive is uniformly dispersed. In addition to the polyisocyanates, there can be incorporated at this point conventional additives, e.g. fillers such as carbon blacks and clays, pigments, catalysts for the isocyanate reaction e.g. dibutyl tin dilaurate, and the like. Other means for incorporating the various additives and crosslinking agents can be employed. The latter can be added during or after oxidation of olefin polymer.

As stated above, it is necessary to oxidize olefin polymers prior to reaction with polyisocyanates in order to improve properties which can be useful in a coating or bonding material such as solvent resistance as well as impart great adhesionability to the olefin polymer.

The carboxyl containing and oxidized olefin polymers are modified in the practice of this invention with organic polyisocyanates by which term is meant to be included polyisocyanates and polyisothiocyanates of the general formula:

$$R(NCG)_x$$

in which $x$ is an integer of 2 or more, preferably 2 or 3, G is a sulfur or oxygen atom and R is any polyvalent organic radical having a valence of $x$ and in which the valence bonds are from hydrocarbon moieties. For example R can be a single hydrocarbon moiety such as alkylene, substituted alkylene, arylene, substituted arylene, a hydrocarbon or substituted hydrocarbon containing one or more aryl-NCG bonds and one or more alkyl-NCG bonds, a hydrocarbon or substituted hydrocarbon containing a plurality of either aryl-NCG bonds or alkyl-NCG bonds. R can also include radicals such as —R'—Z—R'— wherein Z may be any divalent moiety such as

—O—, —O—R—O—, $-\overset{O}{\underset{\|}{C}}-$, $-\overset{O}{\underset{\|}{C}}-O-$, —S—, —S—R—S—, —SO$_2$— etc.; and R' is a divalent hydrocarbon moiety such as alkylene, arylene, substituted alkylene, substituted arylene, aralkylene, alkarylene and the like.

Examples of such compounds include:
Ethylene diisocyanate
Propylene diisocyanate
Butenylene diisocyanate
Butylene diisocyanate
Thiodiethylene diisocyanate
Pentylene diisocyanate
Methylbutylene diisocyanate
Hexamethylene diisocyanate
Dipropyldiisocyanato ether
Thiodipropyl diisocyanate Heptamethylene diisocyanate
2,2-dimethylpentylene diisocyanate
3-methoxyhexamethylene diisocyanate
Octamethylene diisocyanate
2,2,4-trimethylpentylene diisocyanate
Nonamethylene diisocyanate
Decamethylene diisocyanate
3-butoxyhexamethylene diisocyanate
1,4-butylene glycol propylether diisocyanate
Undecamethylene diisocyanate
Dodecamethylene diisocyanate
Thiodihexamethylene diisocyanate
1,3-dimethylbenzene diisocyanate
1,4-dimethylbenzene diisocyanate
1,2-dimethylcyclohexane diisocyanate
1,4-dimethylcyclohexane diisocyanate
1,4-diethylbenzene diisocyanate
1,4-dimethylnaphthalene diisocyanate
1,5-dimethylnaphthalene diisocyanate
1-methylisocyanate 2-n-propylisocyanate 3,5-dimethylcyclohexane
n-Propyl-biphenyl diisocyanate
α,β-(β-ethylisocyanate)-9,10-endoethylene dihydroanthrocene
Cyclohexane-1,3-diisocyanate
Cyclohexane-1,4-diisocyanate
1-methylcyclohexane-2,4-diisocyanate
1-ethylcyclohexane-2,4-diisocyanate
Dicyclohexylmethane-4,4'-diisocyanate
Dicyclohexylmethylmethane-4,4'-diisocyanate
Dicyclohexyldimethylmethane-4,4'-diisocyanate
2,2-dimethyldicyclohexylmethane-4,4'-diisocyanate
3,3'-5,5'-tetramethyldicyclohexylmethane-4,4'-diisocyanate
4-phenylisocyanatemethylisocyanate
4-phenylisocyanate-β-ethylisocyanate
3-phenylisocyanate-α-ethylisocyanate
3-phenylisocyanate-α-propylisocyanate
4-phenylisocyanate-α-propylisocyanate
3-pehnylisocyanate-α-butylisocyanate
4-phenylisocyanate-α-butylisocyanate
Tetrahydronaphthalene-1,5-diisocyanate
1-chlorobenzyl-2,4-diisocyanate
1-nitrobenzyl-2,4-diisocyanate
1-nitrobenzyl-2,5-diisocyanate
1,3-dichlorobenzyl-4,6-diisocyanate
1,4-dichlorobenzyl-2,5-diisocyanate
1-chloro-4-methoxybenzyl-2,5-diisocyanate
1-methoxybenzyl-2,4-diisocyanate
1-methoxybenzyl-2,5-diisocyanate
1-methyl-4-methoxybenzyl-2,5-diisocyanate
1-ethoxybenzyl-2,4-diisocyanate
1,3-dimethoxybenzyl-4,6-diisocyanate
1,4-dimethoxybenzyl-2,5-diisocyanate
1-propoxybenzyl-2,4-diisocyanate
1-isobutoxybenzyl-2,4-diisocyanate
1,4-diethoxybenzyl-2,5-diisocyanate
Azobenzyl-4,4'-diisocyanate
2-methylazobenzyl-4,4'-diisocyanate
Benzylazonaphthalene-4,4'-diisocyanate
Toluene-2,4-diisocyanate
Diphenylether-2,4-diisocyanate
Diphenylether-4,4'-diisocyanate
Dianisidine-diisocyanate
Ethylene glycolphenylether-2,2'-diisocyanate
Diethylene glycolphenylether-2,2'-diisocyanate
Naphthalene-1,4-diisocyanate
Naphthalene-1,5-diisocyanate
Naphthalene-2,6-diisocyanate
Naphthalene-2,7-diisocyanate
1,1'-dinaphthalene-2,2'-diisocyanate
Biphenyl-2,4-diisocyanate
Biphenyl-4,4'-diisocyanate
3,3'-dimethylbiphenyl-4,4'-diisocyanate
3,3'-dimethoxybiphenyl-4,4'-diisocyanate
2-nitrobiphenyl-4,4'-diisocyanate
Diphenylmethane-4,4'-diisocyanate
2,2-dimethyldiphenylmethane-4,4'-diisocyanate
Diphenyldimethylmethane-4,4'-diisocyanate
2,5,2',5',-tetramethyldiphenylmethane-4,4'-diisocyanate
Cyclohexyl di-(4-isocyanate-phenyl)-methane
3,3'-dimethoxydiphenylmethane-4,4'-diisocyanate
4,4'-dimethoxydiphenylmethane-3,3'-diisocyanate
4,4'-diethoxydiphenylmethane-3,3'-diisocyanate
2,2'-dimethyl-5,5'-dimethoxydiphenylmethane-4,4'-diisocyanate
3,3'-dichlorodiphenyldimethylmethane-4,4'-diisocyanate
Benzophenone-3,3'-diisocyanate
α,-β-diphenylethane-2,4-diisocyanate
3-nitrotriphenylmethane-4,4'-diisocyanate
4-nitrotriphenylmethane-4,4'-diisocyanate
2,5,2',5'-tetramethyltriphenylmethane-4,4'-diisocyanate
Fluorene-2,7-diisocyanate
Phenanthroquinone-2,6-diisocyanate
9-ethylcarbazol-3,6-diisocyanate
Pyrene-3,8-diisocyanate
Chrysene-2,8-diisocyanate
Diphenylsulfide-2,4-diisocyanate
Diphenylsulfide-4,4'-diisocyanate
Diphenylsulfone-4,4'-diisocyanate
Diphenylmethylsulfone-4,4'-diisocyanate
4-methyldiphenylsulfone-2,4'-diisocyanate
4-methyl-3-isocyanate-benzyl-sulfonyl-4'-isocyanate-phenylester
4-methoxy-3-isocyanate-benzyl-sulfonyl-4'-isocyanate phenylester
2,2'-dimethyldiphenyldisulfide-5,5'-diisocyanate
3,3'-dimethyldiphenyldisulfide-6,6'-diisocyanate
4,4'-dimethyldiphenyldisulfide-5,5'-diisocyanate
4,4'-dimethyldiphenyldisulfide-3,3'-diisocyanate
4,4'-dimethoxydiphenyldisulfide-3,3'-diisocyanate
3,3'-dimethoxydiphenyldisulfide-4,4'-diisocyanate
4,4-dimethoxydiphenyldisulfone-3,3'-diisocyanate
4-methyl-3-isocyanate-benzylsulfonylanalido-4-isocyanate-3-methyl diisocyanate
Dibenzylsulfonylethylenediamino-4,4'-diisocyanate
3,3'-dimethoxy-4,4'-diisocyanate dibenzylsulfone
4,4'-methoxybenzylethylenedisulfone-3,3'-diisocyanate
4,4'-methoxybenzylethylenediamino-3,3'-diisocyanate
1-methylbenzyl-2,4,6-triisocyanate
1,3,5-trimethylbenzyl-2,4,6-triisocyanate
Naphthalene-1,3,7-triisocyanate
Diphenylmethane-2,4,4-triisocyanate
3-methyldiphenylmethane-4,6,4'-triisocyanate
4,4'-dimethyldiphenylmethane-2,2',5,5'-tetraisocyanate
Triphenylmethane-4,4'-4''-triisocyanate, and
Diphenyl-4,4'-diisocyanate-N-carbamyl acid chloride.

Preferred as the organic isocyanate cross-linking agents in this invention are the diisocyanates, particularly the aromatic diisocyanates where the —N═C═O groups are one different ring carbon atoms of the same or different aromatic ring, e.g. 2,4-toluene diisocyanate, dianisidine diisocyanate (3,3'-dimethoxy-4,4'-biphenylene diisocyanate), bitolylene diisocyanate, tolylene diisocyanate, meta xylylene diisocyanate, and polymethylene polyphenyl isocyanate.

The use of polyisocyanates with carboxyl and oxidized olefin polymers in virtually any concentration is productive or crosslinking and a generally favorable modification of polymer properties. The concentration of polyisocyanate should not exceed, however, 40 percent by weight based on the oxidized olefin polymer as olefin polymer properties are lost to the composition. Conversely use of less than about 0.01 percent by weight polyisocyanate based on the olefin polymer confers only negligible alteration of the olefin polymers. Above 0.25 percent by weight and particularly above about 0.5 percent by weight of crosslinking agent based on the olefin polymer imparts significant property improvement. The improvement in olefin polymer properties from about 0.5 to about 30 percent by weight of polyisocyanate based on the olefin polymer is not proportionately increased by further increasing the polyisocyanate concentration to between 20 and 40 percent by weight. Hence, concentrations of polyisocyanate between 0.5 to 20 percent by weight are preferred. A particularly desirable balance of improved olefin polymer properties are achieved by the use of from about 3 to about 10% of a polyisocyanate having two —N=C=O groups and 1 to 6% of a polyisocyanate having three or more —N=C=O groups based on the olefin polymer and, hence, this concentration of these crosslinking agents is particularly preferred. By the term "polyisocyanate," mixtures of two or more polyisocyanates are meant to be included.

Among the modifications of olefin polymers caused by oxidation and crosslinking with isocyanates in accordance with this invention, one of the most important is an increase in the gel content of the polymer. This property is a measure of the resistance to swelling of an olefin polymer when in contact with solvents; and resistance to swelling is an index to solvent resistance. Thus, as percent gel increases, solvent resistance increases. The gel content is an index to other properties of the crosslinked olefin polymers also. For example, resins having greater than about 10% gel content are improved in clarity over uncrosslinked olefin polymer, hence this amount of gel is highly desirable. For most end-use applications a greater solvent resistance and higher molecular weight is desirable and the olefin polymer should have at least 15% gel content. Also, higher gel content generally means greater stress crack resistance. On the othes hand, ehe surprising adhesional characteristics of the crosslinked polymers of this invention are apparent in resins containing no measurable gel content, i.e. 0% gel; this property improves with increasing gel content.

The amount of gel formation is closely related to the degree of oxidation. For example, gel appears only when a resin having a carbonyl absorbance per mil of above 0.0005 is reacted with a polyisocyanate; a doubling of carbonyl absorbance to 0.001 results in a sextupling of percent gel formation.

The practice of the present invention is illustrated by the following examples wherein all parts and percentages are by weight unless otherwise specified.

Percent gel was determined by immersing a 0.3 gram piece of a 20 mil, cured, crosslinked plaque of olefin polymer enclosed in a 100 mesh copper wire cage, in refluxing ethylbenzene for 16 hours. The cage and contents after this period were dried at 110° C. for 3 hours. The weight of the resin in the cage divided by 0.3 and multiplied by 100 was the percent gel.

Clarity was empirically determined by looking through a 20 mil plaque.

Melt flow was determined according to ASTM D–1238–57T. As provided therein, 1P melt flow refers to the decigrams of resin extruded in one minute through a a standard orifice at 190° C. and 44 pounds per square inch pressure; 10P melt flow is the value found at 190° C. and 440 pounds per square inch pressure.

Carbonyl absorbance per mil was determined by infra red techniques using a 20 mil plaque. Measurements were made at 5.84 microns and absorbance per mil calculated according to the equation:

$$\text{absorbance/mil} = \frac{\log \frac{I_0}{I}}{t}$$

where:
$t$ = thickness in mils
$I^\circ$ = incident radiation, percent transmission
$I$ = transmitted radiation, percent transmission Apparatus used was a Perkin-Elmer Model 21 double beam infra red Spectrophotometer.

The carbonyl absorbance per mil of all olefin polymers except ethylene homopolymers was measured as differential absorbance by placing an equally thick sample of virgin resin into the reference beam while the oxidized polymer sample was in the sample beam. Thus, the carbonyl measured was that formed by the oxidation step.

Peroxide content was determined by weighing 0.500 ±0.001 gram of finely divided polyethylene (powdered to 20 mesh) into an 8 by 1 inch pressure tube; pipetting 25 ml. of alcohol-stabilized tetrachloroethylene into a 50 ml. graduate and adding 7 ml. of a one percent solution of sodium iodide in methanol. This was mixed and added to the resin in the pressure tube which was then capped. Heat at 130° C. was applied for five minutes. The tubes were removed and cooled in Dry Ice for three minutes. Five milliliters of the methanol-iodine layer was pipetted off. The transmission was measured in a Beckman DU Spectrophotometer at 450 and 600 m$\mu$ using the methanol-iodide solution as a blank.

The sodium iodide in methanol was made up as follows: 1.00 gram of sodium iodide was dissolved in 100 grams (125 cc.) of distilled methanol which had been made acid by addition of a drop of phosphoric acid.

Peroxide content was then calculated from the formula:
$A/B \times 100$ = Corrected percent transmission at 450 m$\mu$
$A$ = Percent transmission at 450 m$\mu$
$B$ = Percent transmission at 600 m$\mu$

TABLE II.—VARIATION OF LIGHT TRANSMISSION WITH PEROXIDE CONTENT IN POLYETHYLENE

| Milligrams Peroxidic Oxygen/gram resin | Log of percent Light Transmission (450 m$\mu$, 10 mm. Light Path) |
|---|---|
| 0.05 | 67 |
| 0.1 | 44.5 |
| 0.15 | 29.5 |
| 0.2 | 19.5 |
| 0.25 | 15.0 |

Using the corrected transmission from the above table for the milligrams of peroxidic oxygen per gram resin, the peroxide content is calculated from the equation:

$M/S$ = Peroxidic oxygen, mg. per gm. resin
$M$ = mg. peroxidic oxygen from chart
$S$ = Sample weight Stress cracking resistance was measured as follows:
A compression molded and cured polymer specimen 0.5 inch wide by 1.5 inches long and 125 mils thick was slit 20 mils deep along its length for 75 mils. The specimen was bent 180° and with 9 similar samples in a channel holder immersed in a non-ionic surfactant, nonyl phenoxy polyoxyethylene ethanol, at 50° C. Usually two channel holders were used, providing 20 specimens per test. Failure of a specimen was the appearance of a crack perpendicular to the slit. $F_{50}$ is time of failure of 10 samples of the 20 (i.e. 50% failure).

For convenience, 2,4-toluene diisocyanate is denoted by TDI and dianisidine diisocyanate by DADI.

EXAMPLE 1

*Solution oxidation and crosslinking of polyethlyene with TDI*

The reaction apparatus was a three-neck round-bottom flask equipped with a reflux condenser, a gas inlet tube suspended in the flask below the level of the reactants and a motor driven stirrer.

*Unoxidized control*

Two sixty gram quantities of polyethylene having a density of 0.92 and a 1P melt flow of 2 decigrams/minute and no measurable carbonyl content were dissolved in two flasks each containing 180 grams of refluxing xylene (140° C.). Nitrogen was sparged into the systems through the gas inlet tube. After the polyethylene had completely dissolved, 6.0 grams of TDI was added to each flask. For 3.5 hours the systems were held at reflux, in one experiment with continuous nitrogen purge and in the second experiment without a nitrogen purge but xylene in the vapor space. At the end of this period each product was precipitated by acetone, washed with additional acetone, filtered and dried at 80° C. overnight. The 1P melt flow of the continuously nitrogen purged product was 1.8 decigrams/minute; the non-purged product melt flow was 1.9. Infrared absorption data for these two ethlyene polymers showed no peaks in the 5.8 micron range, i.e., no measurable carbonyl present.

*Simultaneously oxidized and crosslinked ethylene homopolymers*

Sixty grams of polyethylene having a density of 0.92, a 1P melt flow of 2.1 decigrams/minute, a 10P melt flow of 111 decigrams/minutes and having no measurable carbonyl content was dissolved in 180 grams of refluxing xylene (140° C.). After the polyethylene had completely dissolved 6.0 grams of TDI was added to the flask and air was added to the system. For 3.5 hours the system was held at reflux with continuous air purge at a rate of 10 cc./minute which was sufficient to provide a carbonyl absorbance per mil above 0.0005. During this period the solution increased from light yellow at 30 minutes to a deeper yellow with increasing reaction time. After the reaction period, the product was precipitated by the addition of excess acetone, washed with additional acetone, filtered and dried in a vacuum oven at 80° C. overnight. The product was a crosslinked polyethylene which had a 10P melt flow of 0.04 decigram/minute.

Infrared data showed a characteristic carbonyl band at 5.8–5.85 microns and bands indicating presence of

and 1,2,4-substituted phenyl groups.

EXAMPLE 2

*Solution oxidation and reaction of ethylene-carbon monoxide copolymers with TDI*

Sixty grams of ethylene-carbon monoxide copolymer having a 10P melt flow of 165 decigrams/minute and containing about 6% carbon monoxide was used in place of the polyethylene of Example 1. The procedure of Example 1 was used to oxidize the copolymer to a differential carbonyl absorbance per mil of above 0.0005 and to simultaneously crosslink the copolymer by reaction with TDI. The crosslinked product had a 10P melt flow of 0.6 decigram/minute.

EXAMPLE 3

*Melt oxidation and reaction of ethylene homopolymer with TDI*

One hundred and fifty grams of the same type polyethylene used in Example 1 were charged to an intermeshing gear mixing apparatus equipped for atmosphere and pressure control and heated to 140° C. When the polyethylene fluxed, 15 grams of TDI were added and pressure in the closed vessel was increased to 10–15 p.s.i.g. by the addition of dry air. The fluxed polyethylene was vigorously agitated at 140° C. with the 10–15 p.s.i.g. air pressure for 15 minutes which was sufficient to give the homopolymer a carbonyl absorbance per mil of above 0.0005. A sample of the polyethylene was removed and dried at 80° C. overnight. The product had a 10P melt flow of 0.6 decigram/minute.

EXAMPLE 4

*Melt oxidation and reaction of ethylene homopolymer with TDI and using a catalyst*

The apparatus, procedure and reactants of Example 3 were used except that 200 grams of the polyethylene were used and, after the polyethylene fluxed, 20 grams of TDI and 1.0 gram of dibutyl tin dilaurate, a catalyst for the isocyanate reaction, were introduced into the reaction vessel. The product had a 10P melt flow of 0.05 decigram/minute.

EXAMPLE 5

*Melt oxidation and reaction of ethylene homopolymer with TDI and using a catalyst, followed by curing*

The apparatus, procedure and quantities of reactants and catalyst of Example 4 were used. The product was sheeted on a two-roll mill and ground, then molded and cured in a plaque mold at 160° C. for 30 minutes. The cured product had a 10P melt flow of 0.5 decigram/minute.

EXAMPLE 6

*Melt oxidation and reaction of ethylene-styrene copolymers with TDI and using a catalyst, followed by curing*

Sixty-five grams of ethylene-styrene copolymer containing 29% styrene and having a 10P melt flow of 6 decigrams/minute was fluxed on a two roll mill at 150° C. After being milled in the air for 30 minutes to provide a differential carbonyl absorbance per mil of above 0.0005 the polymer was sheeted and ground.

Fifty-five grams of the ground, oxidized copolymer was fluxed on a two-roll mill at 125–130° C. and there was incorporated thereinto a mixture of 5 grams of the oxidized ethylene-styrene copolymer, 6.0 grams of TDI and 0.3 gram of dibutyl tin dilaurate. The material was milled until homogeneous, then sheeted and ground. A fifty-five gram portion of the milled material, having the composition:

| | Parts |
|---|---|
| Ethylene-styrene copolymer | 60 |
| TDI | 6.0 |
| Dibutyl tin dilaurate | 0.3 | was cured in a plaque mold at 150° C. for 30 minutes. The cured product had a 10P melt flow of 1.7 decigrams/minute.

EXAMPLE 7

*Melt oxidation and reaction of polyethylene/polystyrene graft copolymer with TDI and using a catalyst followed by curing*

The apparatus, procedure and reactants of Example 6 were used except that a polyethylene/polystyrene graft copolymer containing 10% polystyrene and having a 10P melt flow of 23.5 decigram/minute was used in place of the ethylene-styrene copolymer of Example 6. The cured product had a 10P flow rate of 0.006 decigram/minute.

EXAMPLE 8

*Melt oxidation and reaction of ethylene homopolymer with TDI and using a catalyst, followed by curing*

One hundred and fifty grams of the type polyethylene used in Example 1 was fluxed on a two-roll mill and milled in the air for 15 minutes, to provide carbonyl absorbance per mil of above 0.0005, then sheeted and ground.

One hundred and forty-five grams of the ground, oxidized polymer was fluxed on a two roll mill at 125–130° C. and a mixture of 5.0 grams oxidized polyethylene, 15 grams TDI and 0.75 gram of dibutyl tin dilaurate was incorporated during milling. The blend, having the composition:

| | Parts |
|---|---|
| Polyethylene | 150 |
| TDI | 15 |
| Dibutyl tin dilaurate | 0.75 | was cured at 150° C. for 30 minutes in a plaque mold. The cured product had a 10P melt flow of 0.18 decigram/minute.

EXAMPLE 9

*Effect of carbonyl content*

The apparatus, procedure and reactants of Example 8 were used except that the initial milling to oxidize the polyethylene was for 30 minutes rather than 15 minutes to provide a carbonyl absorbance per mil of above 0.001. The product after reaction, but before curing, had a 10P melt flow of 0.15 decigram/minute. After curing as in Example 8, the 10P melt flow was 0.02 decigram/minute.

EXAMPLE 10

*Melt oxidation and crosslinking of ethylene-ethyl acrylate copolymers with TDI*

The apparatus and procedure of Example 8 were used including oxidation to a differential carbonyl absorbance per mil of above 0.0005, to crosslink an ethylene-ethyl acrylate copolymer having a 1P melt flow of 4.4 decigrams/minute and containing 6–8 percent combined ethyl acrylate. The cured product has a 10P melt of 1.1 decigrams/minute.

EXAMPLE 11

*Melt oxidation and crosslinking of ethylene-carbon monoxide copolymers with TDI*

The apparatus and procedure of Example 8 were used, including oxidation to a differential carbonyl absorbance per mil of above 0.0005, to crosslink an ethylene-carbon monoxide copolymer having a 1P melt flow of 1.0 decigram/minute and containing about 6 percent combined carbon monoxide. The cured product had a 10P melt flow of 0.26 decigram/minute.

EXAMPLE 12

*Melt oxidation and crosslinking of ethylene-butene copolymers with TDI*

The apparatus and procedure of Example 8 were used, including oxidation to a carbonyl absorbance per mil of above 0.0005, to crosslink an ethylene-butene copolymer formed from an ethylene gas feed containing one mole percent butene and having a 1P melt flow of 0.6 decigram/minute. The cured product had a 10P melt flow of 2.0 decigrams/minute.

The porducts of Examples 9–12 were tested for physical properties. Their properties are compared in the table with properties of the corresponding products (1) unoxidized and (2) oxidized but not reacted with TDI.

EXAMPLE 13

*Cure crosslinking of carbon black filled oxidized ethylene homopolymer*

Thirty-five grams of an ethylene homopolymer of the type used in Example 1, crosslinked with TDI by the method of Example 4 and having a 1P melt flow of 0.009 decigram/minute was blended to a homogeneous mass with 15 grams of a furnace black on a heated two-roll mill. The homogenized product was sheeted and ground. Forty-five grams of the product having the composition:

|  | Parts |
|---|---|
| Polyethylene | 31.8 |
| Carbon Black | 15 |
| TDI | 3.2 | was molded into a tough, nonbrittle plaque having a 10P melt flow of 0.6 decigram/minute.

EXAMPLE 14

*Cure crosslinking of carbon black filled ethylene homopolymer with catalyst*

Two hundred and seventy-five grams of an ethylene homopolymer of the type of Example 1 was fluxed and milled on a two-roll mill for 30 minutes at 150° C. to provide a carbonyl absorbance per mil of above 0.0005. After this milling, there was milled into the resin 200 grams of a furnace black. The resulting carbon black-loaded, oxidized polyethylene was sheeted and ground. One hundred fifty-eight and three tenths grams of the ground material was fluxed on a two-roll mill at 125–130° C. and the mixture of 8.3 grams of the oxidized polyethylene, 9.2 grams TDI and 0.5 gram dibutyl tin dilaurate was milled into the material. The blend had the composition:

|  | Parts |
|---|---|
| Polyethylene | 60 |
| Carbon Black | 40 |
| TDI | 6.0 |
| Dibutyl tin dilaurate | 0.3 |

Fifty-five grams of this blend was cured at 150° C. for 30 minutes. The cured product had a 10P melt flow of 0.02 decigram/minute.

EXAMPLE 15

Example 14 was repeated but using a different carbon

TABLE III.—PHYSICAL PROPERTIES OF OLEFIN POLYMERS (1) UNOXIDIZED, (2) OXIDIZED AND (3) OXIDIZED AND CROSSLINKED WITH TDI

| Ex. | Ethylene Polymer | Oxidation Time at −50° C. (min.) | Parts TDI per 100 Parts Resin | Parts Catalyst per 100 Parts Resin | Flow rate (dg./min.) 1P | Flow rate (dg./min.) 10P | Secant Modulus at 1.0% Elongation | Tensile Properties Ultimate Strength (p.s.i.) | Tensile Properties Elongation, percent | Tensile Properties Yield Strength (p.s.i.) | Tensile Properties Tensile Impact, ft. lbs./in.$^2$ | Vicat Softening Point |
|---|---|---|---|---|---|---|---|---|---|---|---|---|
| 9-1 | Polyethylene | | | | 1.8 | | 17,900 | 1,700 | 520 | 1,220 | 180 | 84.6 |
| 9-2 | do | 30 | | | 1.4 | | 18,200 | 1,620 | 560 | 1,230 | 167 | 88.8 |
| 9-3 | do | 30 | 10 | 0.5 | 0 | 0.5 | 22,600 | 1,410 | 80 | 1,370 | 358 | 95.5 |
| 10-1 | Ethylene-ethylacrylate | | | | 4.4 | | 12,800 | 1,920 | 670 | 976 | 445 | 76.9 |
| 10-2 | do | 30 | | | 5.0 | | 10,400 | 1,600 | 535 | 1,600 | 365 | 76.2 |
| 10-3 | do | 30 | 10 | 0.5 | 0 | 1.1 | 12,000 | 1,890 | 340 | 1,760 | 428 | 85.1 |
| 11-1 | Ethylene-carbon monoxide | | | | 1.0 | | 26,500 | 1,488 | 170 | 1,240 | 109 | 86.0 |
| 11-2 | do | 30 | | | 0.06 | | 19,300 | 1,400 | 185 | 1,270 | 113 | 86.8 |
| 11-3 | do | 30 | 10 | 0.5 | 0 | 1.1 | 22,500 | 1,550 | 74 | 1,550 | 115 | 90.0 |
| 12-1 | Ethylene-butene | | | | 0.6 | | 99,600 | 3,620 | 30 | 3,110 | 60.5 | 119.8 |
| 12-2 | do | 30 | | | 0.8 | | 101,000 | 2,900 | 55 | 2,900 | 67.5 | 119.6 |
| 12-3 | do | 30 | 10 | 0.5 | | 2.0 | 95,600 | 3,140 | 10 | 3,100 | 25.3 | 118.7 |

Vicat softening point, a measure of the elevated temperature performance of a material, is defined as the temperature at which a needle having a point with a surface area of 1 mm.$^2$, under a static load of 1000 grams, will penetrate the test specimen to a depth of 1 mm.

black, a channel black. The cured product had a 10P melt flow of 0.005 decigram/minute.

EXAMPLE 16

A high pressure process ethylene homopolymer having a density of 0.92, zero gel content, a 1P melt flow of 1.7, a carbonyl absorbance per mil of 0.0002 and a peroxide content of 0.04 milligram/gram resin was milled in air for 45 minutes at 170° C. to provide a differential carbonyl absorbance per mil of 0.008 and a peroxide content of 1.9 milligrams/gram resin. The oxidized polyethylene was milled on a two-roll mill at 110° C. and, immediately after fluxing, 3% TDI was incorporated into the polyethylene. The crosslinked polymer was sheeted, ground, and compression molded into 20 mil plaques and cured at 150° C. for 60 minutes.

Percent gel of the cured, crosslinked product was 37 and 1P melt flow was zero decigram/minute. Stress cracking resistance was improved greatly, from 35 to over 500 hours.

EXAMPLE 17–21

The procedure of Example 16 was followed but using in place of the 0.92 density ethylene homopolymer the following:

Example 17: 0.945 density polyethylene (low pressure process).
Example 18: 0.930 density ethylene/6% ethyl acrylate copolymer (high pressure process).
Example 18A: Ethylene/21% ethyl acrylate copolymer (high pressure process).
Example 19: 0.945 density ethylene/carbon monoxide copolymer (1.27 mole percent CO in the feed; high pressure process).
Example 20: Etyhlene/52% propylene copolymer (low pressure process).
Example 20A: Ethylene/11% propylene copolymer (low pressure process).
Example 21: Ethylene/vinyl acetate copolymer (5.76 mole percent vinyl acetate in the feed; high pressure process).

Results of the above examples are presented in Table IV. Data on these ethylene polymers milled with 3% TDI as in Example 16 but without oxidation beforehand are included for comparison.

The vast difference in crosslinking achieved by preoxidizing the olefin polymers is clearly shown in Table IV by a comparison of the negligible melt flows in the preoxidized resins with the only slight difference in melt flow betweenu the control polymers and the unoxidized polymers. All were virtually unchanged except the ethylene/21% ethyl arcylate copolymers where a small amount of the acrylate was hydrolyzed during manufacture to carboxyl and reacted during the tests.

EXAMPLE 22

Effect of extent of preoxidation

Portions of an ethylene homopolymer having a 1P melt flow of 2.0 and a density of 0.92 were oxidized by milling in air for different lengths of time on a two roll mill at 170° C., and thereafter milled, after fluxing, with 10% TDI and cured for 60 minutes at 150° C. The results of different oxidation times are given in Table V below.

TABLE V.—OXIDIZED POLYETHYLENE CROSSLINKED WITH TDI

| Example | Milling time at 170° C. (minutes.) | Peroxide, mg./gm. resin | Absolute Carbonyl Absorbance per mil | 10P melt flow | Gel percent |
|---|---|---|---|---|---|
| 22A | None | 0.04 | 0.0002 | 140 | 0 |
| 22B | 10 | 0.15 | 0.0005 | 120 | 1 |
| 22C | 20 | 0.62 | 0.001 | 75 | 6 |
| 22D | 30 | 1.3 | 0.002 | 44 | 13 |
| 22E | 40 | 1.9 | 0.008 | 20 | 37 |
| 22F | 45 | 2.1 | 0.012 | 1.4 | 46 |
| | 70 | 3.8 | 0.032 | 0 | 63 |

EXAMPLE 23

Effect of di-isocyanate on the extent of crosslinking reaction

Three portions of an ethylene homopolymer were oxidized and milled with 1% (23A), 3% (23B), and 10% (23C) of TDI, sheeted, ground, and cured 60 minutes at 150° C. Results are given in Table VI below.

TABLE IV.—PHYSICAL PROPERTIES OF OLEFIN POLYMERS (1) OXIDIZED, (2) UNOXIDIZED AND (3) MILLED WITH 3% TDI

| Ex. | Ethylene Polymer | Oxidized | | | | Unoxidized | | | |
|---|---|---|---|---|---|---|---|---|---|
| | | Differential carbonyl absorbance per mil | Peroxide, mg./gm. resin | Gel content, percent | 1P melt flow, dg./min. | Carbonyl absorbance per mil | Peroxide, mg./gm. resin | Gel content, percent | 1P melt flow, dg./min. |
| 16 | Low density polyethylene 1.7 1P melt flow (dg./min.). | 0.008 | 1.9 | 37 | 0 | 0.0002 | 0.04 | 0 | 1.7 |
| 17 | High density polyethylene 1.0 1P melt flow (dg./min.). | 0.006 | 1.6 | 46 | 0 | 0.0002 | 0.02 | 0 | 1.0 |
| 18 | Ethylene/6% ethyl acrylate 4.9 1P melt flow (dg./min.). | 0.006 | 1.4 | 16 | 0 | | 0.05 | 0 | 4.9 |
| 18A | Ethylene/21% ethyl acrylate 5.6 1P melt flow (dg./min.). | 0.007 | 1.4 | 42 | 0 | | 0.024 | 2 | 4 |
| 19 | Ethylene/carbon monoxide 5.8 1P melt flow (dg./min.). | 0.012 | 2.7 | 37 | 0 | | 0.06 | 2 | 1 |
| 20 | Ethylene/52% propylene 0.5 1P melt flow (dg./min.). | 0.004 | 1.5 | 17 | 0 | | 0.035 | 2 | 0.2 |
| 20A | Ethylene/11% propropylene 1 1P melt flow (dg./min.). | 0.008 | 1.8 | 7 | 0 | | 0.045 | 1 | 0.4 |
| 20B | Ethylene/vinyl acetate 7.2 1P melt flow (dg./min.). | 0.007 | 1.3 | 19 | 0 | | 0.05 | 1 | 7.2 |

TABLE VI

| Example | Polyethylene | Percent Diisocyanate | Peroxide, mg./gm. resin | Absolute carbonyl absorbance per mil | 10P melt flow | Gel, percent |
|---|---|---|---|---|---|---|
| | Unoxidized | | 0.04 | 0.0002 | 140 | 0 |
| 23A | Oxidized | 1 | 2.1 | 0.01 | 4 | 18 |
| 23B | do | 3 | 2.1 | 0.01 | 0.09 | 37 |
| 23C | do | 10 | 2.1 | 0.01 | 0 | 66 |

EXAMPLE 24

The procedure of Example 23 was followed using the ethylene/carbon monoxide copolymer of Example 19 in place of ethylene homopolymer. Results are given in Table VII.

TABLE VII

| Example | Ethylene/Carbon Monoxide Polymer | Percent Diisocyanate | Peroxide, mg./gm. resin | Absolute carbonyl absorbance per mil | 10P melt flow | Gel, percent |
|---|---|---|---|---|---|---|
|  | Unoxidized |  | 0.06 |  | 320 | 0 |
| 24A | Oxidized | 1 | 1.7 | 0.006 | 21 | 22 |
| 24B | ----do---- | 3 | 1.7 | 0.006 | 6 | 37 |
| 24C | ----do---- | 10 | 1.7 | 0.006 | 0 | 54 |

EXAMPLE 25

*Improvement in adhesion properties of oxidized polyethylene by reacting with polyisocyanates*

Ethylene homopolymer having a density of 0.62 and a melt index of 2.1 was oxidized, and mixed with 6% of a diisocyanate in the manner of Example 16. A 10 mil film was removed from the rolls and placed between a 20 mil thick sheet of polyethylene and a solvent washed, cold rolled steel panel. The assembly was placed between cellophane wrapped polished platens and cured under 500 pounds/sq. in. at 170° C. for 10 minutes pressure in a standard hydraulic steam heated press.

The peel adhesion of the polyethylene film sheet to the substrate was measured according to ASTM D-903 on a Scott tensile tester in the following manner:

A one inch wide strip was cut across the polyethylene and down to the substrate. The strip was then peeled from the substrate at a constant rate of one inch/minute and the force required measured in pounds/inch.

Results with two polyisocyanates are given in Table VIII below.

TABLE VIII.—OXIDIZED POLYETHYLENE REACTED WITH POLYISOCYANATES

Peroxide, mg./gm ---------------------------------------- 1.9
Carbonyl Absorbance/mil ------------------------------- 0.007

| Example | Diisocyanate | Percent | Peel Strength (lbs./in.) Oxidized [1] |
|---|---|---|---|
| 25A | TDI | 6 | >40 |
| 25B | DADI | 6 | >40 |

[1] Sample milled in air 45 minutes at 170° C.

EXAMPLE 26

*Improvement in adhesion properties of oxidized ethylene/propylene copolymer by reacting with polyisocyanates*

The procedure of Example 25 was followed except that the ethylene propylene copolymer of Example 20A was used in place of polyethylene.

Results are given in Table IX below.

TABLE IX.—OXIDIZED ETHYLENE/PROPYLENE COPOLYMER AND POLYISOCYANATES

Peroxide, mg./gm ---------------------------------------- 1.2
Carbonyl Absorbance/mil ------------------------------- 0.0013

| Example | Diisocyanate | Percent | Peel Strength (lbs./in.) Oxidized [1] |
|---|---|---|---|
|  |  |  | 7 |
| 26B | DADI | 6 | 39 |

[1] Sample milled in air 45 minutes at 170° C.

EXAMPLE 27

*Improvements in adhesion of oxidized polyethylene to synthetic resin substrates by reacting with polyisocyanates*

The procedure of Example 25 was followed except that Mylar (trademark of E. I. du Pont de Nemours for polyethylene terephthalate copolymer) and nylon were used as substrates in place of cold rolled steel.

Results are given in Table X.

TABLE X.—OXIDIZED POLYETHYLENE AND POLYISOCYANATES

| Example | Peroxide Content, mg./gm. | Carbonyl Absorbance per mil | Diisocyanate 6% | Substrate Peel Strength (lbs./in.) | |
|---|---|---|---|---|---|
|  |  |  |  | Mylar (film) 5 mil | Nylon (film) 20 mil |
|  | 0.04 | 0.0002 |  | 1 | 1 |
|  | 1.5 | 0.004 |  | 1-2 | 4 |
| 27A | 1.5 | 0.004 | DADI | 4-5 |  |
| 27B | 1.5 | 0.004 | TDI |  | 11 |

The polyisocyanate reacted polyethylenes are improved in adhesion over oxidized polyethylenes which have not been reacted with a polyisocyanate.

As broadly pointed out above olefin polymers containing carboxyl (—COOH) groups in their structures are crosslinked to advantage by polyisocyanates. The term "carboxyl group" is intended to embrace an anhydride group. Specifically, improvements are obtained in such olefin polymers which contain at least 50 percent by weight of a combined alpha monoethylenically unsaturated hydrocarbon having from 2 to 4 carbon atoms, inclusive, preferably ethylene and up to 50 percent by weight of one or two monomers copolymerizable with ethylene and which contain a carboxyl group. These olefin polymers suitably have a melt index (ASTM 1238–57T) in the range of 0 to 1000 and preferably in the range of 0.02 to 100 decigrams/minute. Examples of these olefin polymers, illustrative of the class are: ethylene/acrylic acid copolymers; ethylene/methacrylic acid copolymers; ethylene/monobutyl maleate copolymers; ethylene/bicyclo-(2,2,1)-hept-2-ene-5-carboxylic acid copolymers; polyethylene/maleic anhydride graft copolymer; especially containing above 0.5 percent by weight carboxyl groups (calculated as maleic anhydride); ethylene/ethyl acrylate/acrylic acid terpolymers; and ethylene/vinyl acetate/acrylic acid terpolymers, all containing a minimum of 50 percent combined ethylene, propylene or butene-1. These carboxyl containing olefin polymers contain from 1 to about 15 percent by weight carboxyl groups and preferably from 1 to 10 percent by weight carboxyl groups.

The improvements obtained in these olefin polymers by modification with polyisocyanates are in many respects similar to improvements obtained in the hereinabove described olefin polymer e.g., increased adhesionability, improved solvent resistance and clarity, excellent stress crack resistance, increased molecular weight, improved tensile properties and impact strength.

The foremost advantages of the carboxyl containing olefin polymers crosslinked with polyisocyanate are first a great variability in the modulus (stiffness) of the resulting material depending on reactants and reaction conditions. Whereas olefin polymers without carboxyl groups when crosslinked with polyisocyanate retain substantially their modulus, e.g. 15,000–140,000 p.s.i. the carboxyl containing olefin polymers when crosslinked with polyisocyanates can vary from as low as 500 p.s.i. to as high as 150,000 p.s.i. in modulus with products under 200 p.s.i. modulus being elastomeric in nature. The second great advantage is the improved tensile strength both at room temperature i.e. 23° C. and at elevated temperatures e.g. 100° C.

In the carboxyl containing olefin polymer compositions now being described the concentration of polyisocyanate is suitably within the limits set out above and is preferably in the range of 0.2 to 25 parts, particularly from 0.5 to 15 parts of the polyisocyanate per 100 parts of the carboxyl containing olefin polymer.

In the following examples the carboxyl containing olefin polymer was fluxed on a two roll mill at about 120° C. and the polyisocyanate was then milled for about 10 minutes, including ten end passes to assure complete dispersion of the additive. Compression molded plaques (20 mils thick unless otherwise noted) were prepared by curing at a temperature and for a time indicated in each example.

The various carboxyl containing olefin polymers were prepared either by directly polymerizing ethylene with carboxyl group containing monomers, such as acrylic acid, methacrylic acid, monobutyl maleate, or bicycloheptene carboxylic acid or by complete or partial hydrolysis of a copolymer of ethylene and the ester analog of the desired acid, e.g. ethylene/ethyl acrylate copolymer hydrolyzed to make an ethylene/acrylic acid copolymer. Terpolymers are prepared by either polymerizing ethylene and, e.g. acrylic acid with a third monomer, e.g. an ester such as ethyl acrylate or vinyl acetate, or by only partially hydrolyzed ethylene/and e.g. ethyl acrylate copolymer. Another method of preparing suitable olefin polymers is to pyrolyze ethylene homopolymer or copolymer with a monomer such as maleic anhydride. This is a free radical process carried out, for example, in a tube at 250–375° C. which results in the incorporation of anhydride groups (as succino anhydride) into the polymer chain.

Test procedures not previously identified were:
*Flow index.*—ASTM D-1238-57T at 440 p.s.i.
*Tensile impact.*—A dumbbell specimen 3/8" x 2½" is mounted in a Izod Impact Tester so that a high rate of loading is applied parallel to the long direction of the specimen. Results are reported as modulus of toughness. United are ft.-lbs./cu. in. of specimen.
*Tensile strength.*—ASTM-D-412-51T, except 1"/minute up to yield, thereafter to break 20"/minute.
*Modulus (secant modulus of elasticity).*—ASTM-D-638-58T, except 4" gripping surfaces, speed B and die A of ASTM-D-412-51T.
*Chemical resistance.*—Pieces about 2" x 2" x 20 mils placed in various solvents for one week. Percent gain in weight is determined.
*Brittleness temperature.*—ASTM-D-1003-52.
*Durometer hardness.*—ASTM-D-676-55T-"A" and ASTM-D-1484-57T-"D".
*Compression set.*—ASTM-D-395-55-Method B; 100° C., 70 hours.
*Tension set.*—A 5" x 1/8" x 20 mil specimen stretched 200%, held one minute, then released. Set is recovery of original length after 10 minute relaxation.

EXAMPLE 28

An ethylene/acrylic acid copolymer containing 4.3 percent acrylic acid was modified with 8 percent DADI. Cure was at 180° C. for 15 minutes. Properties of the copolymer before and after modification were as follows:

|  | Before | After |
|---|---|---|
| Melt Index | 4.0 |  |
| Flow Index | >200 | 87 |
| Percent Gel | 0 | 34 |

EXAMPLE 29

Example 28 was duplicated but using 10% of a phenol-blocked polyisocyanate (Mondur S), an ethylene/acrylic acid copolymer containing 13.5% acrylic acid and curing for 30 minutes. Properties were:

|  | Before | After |
|---|---|---|
| Melt Index | 0.25 |  |
| Flow Index | 31 | 11 |
| Percent Gel | 0 | 47 |

EXAMPLE 30

Example 28 was duplicated but using an ethylene/monobutylmaleate copolymer containing 11.1% monobutylmaleate and 3% TDI. Cure was at 150° C. for 30 minutes. Properties were:

|  | Before | After |
|---|---|---|
| Melt Index | 0.35 |  |
| Flow Index | 28 | <0.1 dg./min. |
| Percent Gel | 0 | 90 |

EXAMPLE 31

Example 30 was duplicated but using 1% TDI. Properties were:

|  | Before | After |
|---|---|---|
| Melt Index | 0.35 |  |
| Flow Index | 28 | 2.6 |
| Percent Gel | 0 | 50 |

EXAMPLE 32

An ethylene/acrylic acid copolymer containing 9.2% acrylic acid and hence 5.7% —COOH was modified with 3% TDI. Cure was at 180° C. for 30 minutes. Properties were:

|  | Before | After |
|---|---|---|
| Melt Index | 0.1 |  |
| Flow Index | 0.6 | <0.1 |
| Percent Gel | 0 | 89 |

EXAMPLE 33

Example 32 was duplicated but curing at 170° C. for 30 minutes.

| Property | Before | After |
|---|---|---|
| Gel | 0 | 89 |
| Flow Index | 0.6 | 0 |
| Clarity (visual) | Poor | Good |
| Percent Haze | 40 | 20 |
| Percent Transmission | 80 | 91 |
| Tensile strength (p.s.i.) | 750 | 1,530 |
| Elongation, percent at 80° C | 150 | 270 |
| Yield Strength (p.s.i.) | 650 | 1,420 |
| Tensile Impact (−30° C.) | 66 | 130 |
| Chemical Resistance, 23° C./week: |  |  |
| 95% alcohol | 7 | 0 |
| CCl$_4$ | 25 | 0.3 |
| NaOH, 10% | 2 | 0.2 |
| Stress Crack Resistance (hrs.) |  | >504 |

EXAMPLES 34–35

Stress crack resistance

An ethylene/ethyl acrylate copolymer partially hydrolyzed to an 85% ethylene/11% ethyl acrylate/4% acrylic acid terpolymer was modified by placing in TDI for 30 minutes, then curing at 80° C. for 2 hours (Example 34) and by placing the terpolymer in TDI for 18 hours, and then curing at 80° C. for 3 hours (Example 35). Stress cracking data were:

|  | All Specimens Failed In— | $F_{50}$, hours | Percent Gel |
|---|---|---|---|
| Control | 48 hours | 8 | 0 |
| Example 34 | >504 hours | >504 | ca. 80 |
| Example 35 | >504 hours | >504 | ca. 80 |

EXAMPLES 36–37

Elastomeric terpolymers

An ethylene/20% ethyl acrylate/4.2% acrylic acid terpolymer was modified with 5% of TDI (Example 36) and 9% DADI (Example 37). Cure was at 160° C. for 30 minutes. Properties were:

| Property | Control | Example 36 | Example 37 |
|---|---|---|---|
| Gel | 0 | 67 | 68 |
| Flow Index | 425 | 0.3 | <0.1 |
| Durometer "A" | | ca. 72 | |
| Modulus (p.s.i.) | | 1,420 | 1,310 |
| Tension Set (percent) | 20 | 29 | 37 |
| Compression Set (percent) | (Melts) | 61 | |
| Tensile Impact | 430 | 316 | 570 |
| Tensile Strength | 270 | 1,095 | 1,330 |
| Elongation | 380 | 440 | 355 |
| Yield Strength at— | | | |
| 23° C | 165 | 400 | 420 |
| 100° C | 0 | 110 | 280 |
| Chemical Resistance:[1] | | | |
| Gasoline | Soluble | 170 | |
| Oil | 20 | 20 | |
| Toluene | Soluble | 340 | |

[1] Percent increase in weight.

EXAMPLE 38

A 74.4% ethylene/6.4% ethyl acrylate/19.2% acrylic acid terpolymer having a melt index of 3.0 was prepared by treating a 67% ethylene/33% ethyl acrylate copolymer having a melt index of 70 with per 11 grams of copolymer 0.5 grams of potassium hydroxide as a 0.5N KOH solution having the following composition: 900 ml. of xylene, 60 ml. water, 160 ml. n-butanol and 28 grams potassium hydroxide. After reaction at reflux for 1.5 hours, the system was acidified by adding 65 ml. of hydrochloric acid. The product was precipitated into excess isopropanol, filtered and washed 3 times each with water and isopropanol and then dried.

This product, 70 grams, was milled with 7 grams of TDI and 0.35 grams of dibutyl tin dilaurate on a two roll mill at 110–120° C.

A 45 gram portion of the resulting composition containing 100 parts terpolymer, 10 parts TDI and 0.5 parts dibutyl tin dilaurate was cured at 150° C. for 30 minutes in a 6.5″ x 8″ x 0.040″ plaque mold. The product was clear, tough, rubbery, infusible and insoluble in common organic solvents.

EXAMPLE 39

Example 38 was duplicated but using a 85.1% ethylene/11.0% ethyl acrylate/3.9% acrylic acid terpolymer having a melt index of 1.9 and 7.8% DADI as the crosslinking agent. Gel was 83%; tensile strength at 23° C. was 675 p.s.i.; and tensile impact was 120 foot pounds/cubic inch.

EXAMPLE 40

Example 39 was duplicated but using a 85.8% ethylene/20% ethyl acrylate/4.2% acrylic acid terpolymer having a flow index of 425 and 8.8% of DADI. Cure was at 130° C. for 30 minutes. Gel was 65%. Flow index was <0.1 dg./min.

EXAMPLE 41

Using the terpolymer of Example 40 crosslinking was carried out with 5.2% TDI. Cure was at 180° C. for 30 minutes. Gel was 54%. Flow index was 0.026 dg./min.

EXAMPLE 42

Example 41 was duplicated but using 6% of Mondur S and a 92.7% ethylene/1.5% ethyl acrylate/5.8% acrylic acid terpolymer having a flow index of 52. Gel was 30%. Flow index was 11 dg./min.

What is claimed is:

1. An adhesive consisting of the reaction product of an oxidized olefin polymer having a peroxide content of from 0.15 to 3.5 milligrams per gram resin and containing at least 10 percent by weight of a combined alpha monoethylenically unsaturated hydrocarbon containing from 2 to 4 carbon atoms inclusive and from 0.25 to 40 percent by weight based on the weight of the olefin polymer of an organic isocyanate having at least two —N=C=O groups.

2. The product claimed in claim 1 wherein the organic isocyanate is selected from the group consisting of 2,4-toluene diisocyanate and dianisidine diisocyanate.

3. An adhesive consisting of the reaction product of an olefin polymer containing from 1 to 15% by weight carboxyl groups which comprises at least 50 percent by weight of a combined alpha monoethylenically unsaturated hydrocarbon having from 2 to 4 carbon atoms, inclusive, and up to 50% by weight of a carboxyl containing monomer copolymerized with said hydrocarbon and from 0.2 to 25 parts by weight based on the weight of the olefin polymer of an organic isocyanate having at least two —N=C=O groups.

4. The adhesive as defined in claim 3 wherein said olefin polymer containing from 1 to 15 percent by weight carboxyl groups is a polyethylene-maleic anhydride graft copolymer.

5. The adhesive as defined in claim 3 wherein said olefin polymer containing from 1 to 15 percent by weight carboxyl groups is an ethylene-vinyl acetate-acrylic acid terpolymer.

6. The adhesive as defined in claim 3 wherein said unsaturated hydrocarbon is ethylene and said carboxyl group containing monomer is acrylic acid.

References Cited

UNITED STATES PATENTS

| | | | |
|---|---|---|---|
| 2,565,783 | 8/1951 | Schouteden | 260 |
| 2,690,780 | 10/1954 | Cousin | 260—77.5 |
| 2,826,570 | 3/1958 | Evett | 260 |
| 2,877,212 | 3/1959 | Seligman | 260—77.5 |
| 2,916,481 | 12/1959 | Gilmont | 260—96 |
| 3,027,343 | 3/1962 | Kane | 260—77.5 |
| 3,179,716 | 4/1965 | Bruin et al. | 260—878 |
| 3,228,793 | 1/1966 | Stemmer et al. | 177—161 |

FOREIGN PATENTS

| | | |
|---|---|---|
| 581,279 | 10/1946 | Great Britain. |

OTHER REFERENCES

Renfrew et al., Polythene, 1960, pp. 390–391 relied on.

DONALD E. CZAJA, *Primary Examiner.*

LEON J. BERCOVITZ, *Examiner.*

M. C. JACOBS, F. McKELVEY, *Assistant Examiners.*